US009103302B2

(12) United States Patent
Takahashi et al.

(10) Patent No.: US 9,103,302 B2
(45) Date of Patent: Aug. 11, 2015

(54) DUAL ELECTROMAGNETIC VALVE AND EVAPORATED GAS TREATMENT SYSTEM

(75) Inventors: Masaji Takahashi, Tokyo (JP); Takayuki Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 523 days.

(21) Appl. No.: 13/643,762

(22) PCT Filed: Aug. 25, 2010

(86) PCT No.: PCT/JP2010/005225
§ 371 (c)(1), (2), (4) Date: Oct. 26, 2012

(87) PCT Pub. No.: WO2012/025958
PCT Pub. Date: Mar. 1, 2012

(65) Prior Publication Data
US 2013/0042839 A1 Feb. 21, 2013

(51) Int. Cl.
*F02M 33/04* (2006.01)
*F02M 25/08* (2006.01)
*F16K 31/06* (2006.01)

(52) U.S. Cl.
CPC ..... *F02M 25/0836* (2013.01); *Y10T 137/87314* (2015.04)

(58) Field of Classification Search
CPC ....... F02M 33/04; F02M 33/08; F02M 33/02; F02M 69/04; F02M 51/06; F02M 51/08; F02M 25/0836; F16K 31/06; Y01T 137/87217; Y01T 137/87314
See application file for complete search history.

(56) References Cited

U.S. PATENT DOCUMENTS

| | | | | |
|---|---|---|---|---|
| 5,289,811 | A | 3/1994 | Covert et al. | |
| 5,353,770 | A | 10/1994 | Osanai et al. | |
| 5,551,406 | A * | 9/1996 | Everingham et al. | 123/520 |
| 6,769,416 | B2 | 8/2004 | Itou et al. | |
| 2009/0078238 | A1 | 3/2009 | Ueda et al. | |
| 2011/0000563 | A1 | 1/2011 | Ito et al. | |

FOREIGN PATENT DOCUMENTS

| | | | |
|---|---|---|---|
| JP | 6-10780 | A | 1/1994 |
| JP | 6-272628 | A | 9/1994 |
| JP | 7-4324 | A | 1/1995 |
| WO | WO 02/092989 | A1 | 11/2002 |
| WO | WO 2007/020736 | A1 | 2/2007 |
| WO | WO 2008/090657 | A1 | 7/2008 |

* cited by examiner

*Primary Examiner* — Hieu T Vo
(74) *Attorney, Agent, or Firm* — Birch, Stewart, Kolasch & Birch, LLP

(57) ABSTRACT

A tubular flow path 18 of a first electromagnetic valve 10 and a tubular flow path 28 of a second electromagnetic valve 20 are inserted into a chamber 5 to communicate with a suction port 31 and a discharge port 32 to reduce a pulsating sound. The suction port 31 is arranged between the tubular flow paths 18 and 28 to reduce the air flow resistance.

10 Claims, 6 Drawing Sheets

Driving Example During High Negative Pressure

Driving Example During Low Negative Pressure

DUAL ELECTROMAGNETIC VALVE AND EVAPORATED GAS TREATMENT SYSTEM

TECHNICAL FIELD

The present invention relates to a dual electromagnetic valve for controlling the amount of an evaporated gas to be supplied from a fuel tank to an engine in an evaporated gas treatment system.

BACKGROUND ART

An evaporated gas treatment system of a vehicle enables the evaporated gas volatilized in a fuel tank to temporarily adsorb on a canister, and introduces the gas into the engine for recombustion using the engine negative pressure, thereby preventing the discharge of the gas to the outside. In recent years, the reduction of the engine operation frequency due to the trend of vehicles toward HEVs (Hybrid Electric Vehicles) or the like causes the reduction of the treatment capability of the evaporated gas treatment system using the engine negative pressure. In order to increase the flow rate of the evaporated gas to be supplied to the engine upon occurrence of the negative pressure corresponding to the reduction of the engine operation frequency, there has been a demand for a higher flow rate of the electromagnetic valve to be disposed at the path establishing a communication between the canister and the engine.

However, the higher flow rate of the electromagnetic valve causes a variety of detriments such as the scale-up of the base, and the degradation of the low-flow-rate precision (flow rate resolution). Therefore, in the past, a parallel arrangement of electromagnetic valves with a low flow rate enables a high-flow-rate control (for example, see Patent Documents 1 and 2). The use of a plurality of electromagnetic valves enables the improvement of the controllability owing to the enhancement of the flow rate resolution as compared with the case where a higher flow rate is controlled by a single electromagnetic valve. Particularly, in Patent Document 1, a positive suction type electromagnetic valve and a reverse suction type electromagnetic valve are arranged in parallel; in a lower flow rate region in which there may occur a phenomenon referred to as jumping such that the flow rate rapidly increases or decreases upon valve opening, only the reverse suction type is driven, and also in a higher flow rate region than the lower flow rate region in which no jumping substantially occurs, both of the positive suction type and the reverse suction type are driven to suppress the jumping; thus, it is contemplated that the lower flow rate precision is improved.

The higher flow capacity of the electromagnetic valve also raises pulsating sounds caused by a flow of air. For this reason, as a countermeasure against the pulsating sound upon the higher flow rate, in the past, a large capacity chamber is inserted between the ports of the electromagnetic valves; however, layout property thereof is deteriorated. Therefore, in Patent Document 1, two electromagnetic valves are inserted in the chamber to be included therein, and when operation timings thereof are changed, it is contemplated to synthesize and cancel the pressure fluctuations caused by the opening/closing operations of the electromagnetic valves.

PRIOR ART DOCUMENTS

Patent Documents

Patent Document 1: WO 2007/20736

Patent Document 2: Japanese Patent Application Laid-open No. H07-4324 (JP-A-07-4324)

SUMMARY OF THE INVENTION

However, in Patent Document 1, the evaporated gas introduced from one inlet port to two electromagnetic valves is led out to respective outlet ports branching in two directions, and the outlet ports merge into one on the downstream side to be connected to the engine side; thus, there is a problem such that a pressure loss is unfavorably caused. For this reason, the pressure loss causes the reduction of the flow rate, which makes it impossible to make full use of the control capability (control flow rate) of each individual electromagnetic valve. Further, there are also the problems such as the deterioration of the layout property due to the scale-up of the base by the integration of the chamber for a countermeasure against the pulsating sound with the electromagnetic valves, and the complication of the controllability by changing the operation timing.

Also in Patent Document 2, since a large capacity chamber is required to be connected separately between the two electromagnetic valves, there are problems such that the layout property is deteriorated, and that also the flow rate is reduced due to the occurrence of the pressure loss at the connection piping.

The present invention is made to solve the foregoing problems, and an object of the invention is to provide a dual electromagnetic valve such that through the use of two electromagnetic valves, the flow rate resolution is enhanced to thereby improve the controllability as compared with the case where a high flow rate is controlled by a single electromagnetic valve, and that the integration with the chamber simplifies the piping to thus reduce the pressure loss and also reduce the pulsating sound.

A dual electromagnetic valve of the present invention includes: a housing composed of a suction port, a discharge port, and a chamber; a first electromagnetic valve having a flow path part inserted into the chamber, and communicating with the suction port and the discharge port, and a solenoid part for operating a valve to open and close the flow path part; a second electromagnetic valve having a flow path part inserted into the chamber, and communicating with the suction port and the discharge port, and a solenoid part for operating a valve to open and close the flow path part; and a merging path, provided in the housing, for merging the outlet side of the flow path part of the first electromagnetic valve and the outlet side of the flow path part of the second electromagnetic valve to be led to the suction port, wherein in the housing, one of the suction port and the discharge port is arranged between the flow path parts of a pair of the electromagnetic valves, and a central axis position of one of the suction port and the discharge port is arranged at a central position between the flow path parts of the pair of the electromagnetic valves.

According to the invention, since it is configured that the fluid introduced from the one port is led out from the other port through the chamber and a pair of the electromagnetic valves, as compared with the case where a high flow rate is controlled by a single electromagnetic valve, the flow rate resolution can be enhanced, thereby to improve the controllability, and further the piping can be simplified to thereby reduce the pressure loss and also reduce the pulsating sound.

Further, an evaporated gas treatment system of the invention includes: a canister for collecting an evaporated gas volatilized in a fuel tank, an engine for sucking the evaporated gas collected in the canister by a negative pressure for recombustion, and the above dual electromagnetic valve for controlling the amount of the evaporated gas flowing through the piping connecting the canister and the engine.

According to the invention, through the use of the above dual electromagnetic valve, even an evaporated gas treatment system of a vehicle that is low in engine operation frequency due to an implementation of HEV and the like can increase the amount of the evaporated gas, which enables to enhance the treatment capability.

BRIEF DESCRIPTION OF THE DRAWINGS

FIG. 6(*a*), FIG. 6(*b*), and FIG. 6(*c*) represent a first electromagnetic valve, a second electromagnetic valve, and the whole dual electromagnetic valve, respectively.

BEST MODE FOR CARRYING OUT THE INVENTION

In the following, in order to explain the present invention in more detail, embodiments of the invention will be described with reference to the accompanying drawings.

Embodiment 1

Figure 1:
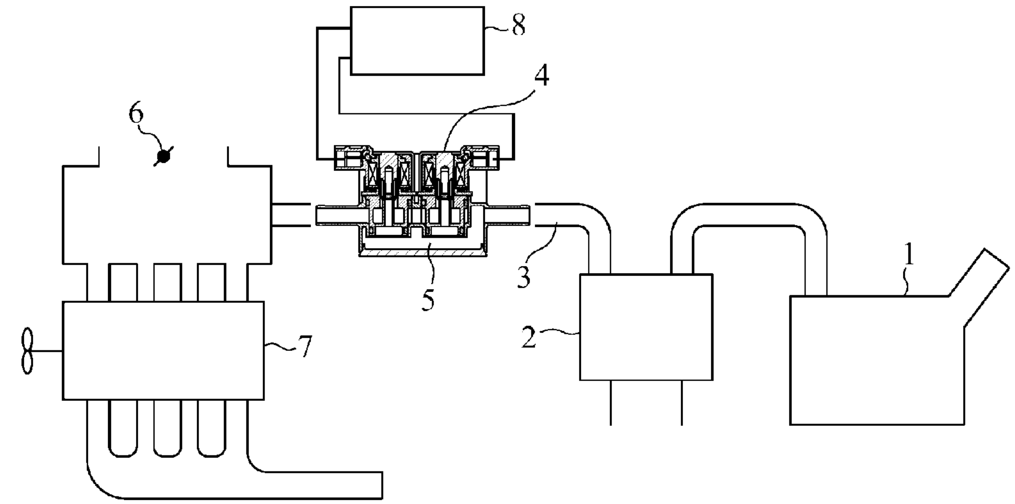
FIG. 1 is an overall schematic view of an evaporated gas treatment system to which a dual electromagnetic valve according to Embodiment 1 of the present invention is applied.

In an evaporated gas treatment system shown in FIG. 1, the evaporated gas volatilized in a fuel tank 1 is temporarily collected in a canister 2; through the use of the negative pressure produced in an engine 7, the evaporated gas is sucked from the canister 2 into the engine 7 for recombustion, thereby to be prevented from being discharged to the outside. In a suction path 3 connecting the canister 2 and the engine 7, a dual electromagnetic valve 4 integrated with a chamber 5 is arranged, and controls the amount of the evaporated gas in response to a driving signal from a control unit 8.

Figure 2:
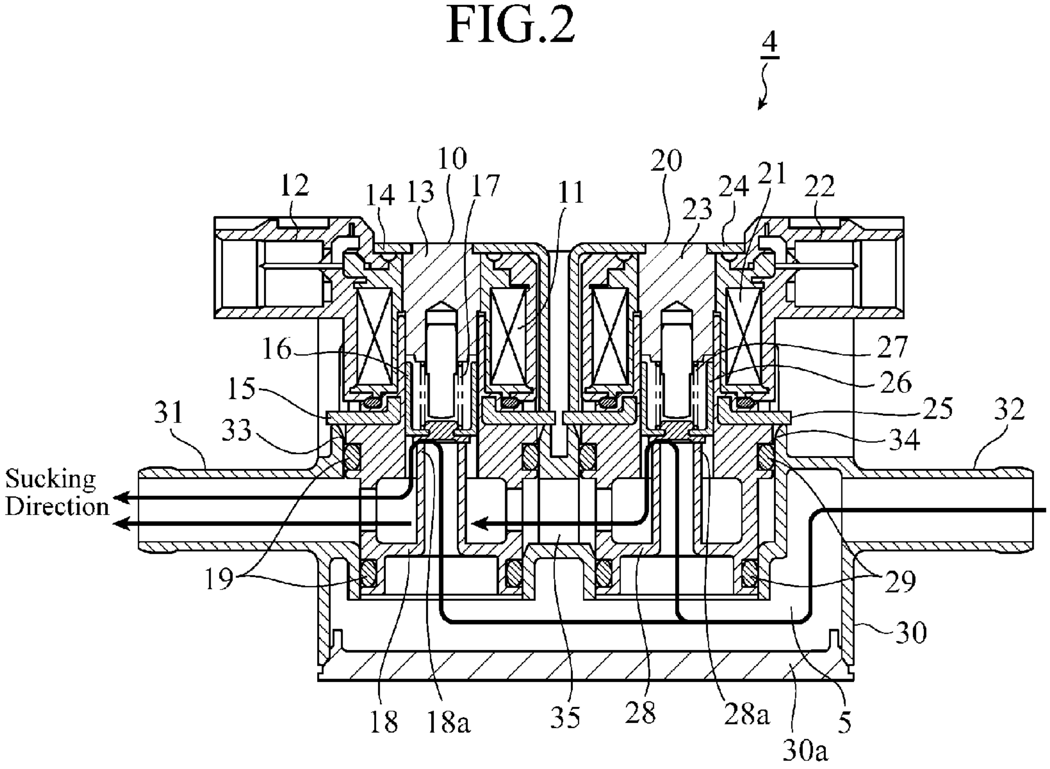
FIG. 2 is a longitudinal cross-sectional view showing the configuration of the dual electromagnetic valve according to Embodiment 1.

FIG. 2 is a longitudinal cross-sectional view showing the configuration of the dual electromagnetic valve 4. The dual electromagnetic valve 4 includes: a housing 30 composed of a suction port 31, a discharge port 32, and a chamber 5 communicating with the ports; a pair of electromagnetic valves 10 and 20 having tubular flow paths (flow path parts) 18 and 28 inserted into the chamber 5, and communicating with the suction port 31 and the discharge port 32, and solenoid parts for operating plungers (valves) 16 and 26 and opening/closing the tubular flow paths 18 and 28, respectively; and a valve communication path (connection path) 35 for merging respective outlet sides of the tubular flow paths 18 and 28 to be connected to the suction port 31. For explanation, in the following, one is referred to as a first electromagnetic valve 10, and the other is referred to as a second electromagnetic valve 20 differently.

The first electromagnetic valve 10 includes: a coil 11 formed of a lead wire wound around a bobbin as a solenoid part; a feed terminal 12 for passing a current to the coil 11; a core 13 to be excited by the passage of a current through the coil 11; a yoke 14 and a plate 15 of a sheet metal member for forming a magnetic circuit together with the core 13; a plunger 16 to be sucked to the core 13; and a spring 17 for urging the plunger 16 in a direction opposite to the direction of suction of the core 13. In addition, the first electromagnetic valve 10 includes: the tubular flow path 18 inserted in the chamber 5, and opened/closed by the operation of the plunger 16; and O rings 19, 19 for occluding the gap between the chamber 5 and the tubular flow path 18. One end of the tubular flow path 18 becomes a valve sheet 18*a* on which the plunger 16 abuts, and the other end thereof communicates with the chamber 5.

Similarly, the second electromagnetic valve 20 also includes a coil 21, a feed terminal 22, a core 23, a yoke 24, a plate 25, a plunger 26, a spring 27, a tubular flow path 28, a valve sheet 28*a*, and O rings 29, 29.

The control unit 8 is constructed by an engine control unit (hereinafter, ECU) for performing the operation control of the engine 7, or a special-purpose control unit. From the control unit 8, driving signals with a prescribed frequency are outputted to the feed terminals 12 and 22, respectively, and a current is passed through the coils 11 and 21 to operate the plungers 16 and 26 so as to control the opening degrees of the valve sheets 18*a* and 28*a*.

The housing 30 includes: a suction port 31 and a discharge port 32 connected with a suction path 3; a chamber 5 for reducing the pulsating sound to communicate with the ports; an insertion hole 33 into which the tubular flow path 18 of the first electromagnetic valve 10 is inserted; an insertion hole 34 into which the tubular flow path 28 of the second electromagnetic valve 20 is inserted; and a valve communication path 35 for merging a fluid passing through the first electromagnetic valve 10 and a fluid passing through the second electromagnetic valve 20, and leading the resultant to the suction port 31. In the illustrated example, the port for establishing a connection between the canister 2 and the chamber 5, and introducing the evaporated gas collected at the canister 2 to the chamber 5 is referred to as the discharge port 32, and the port for establishing a connection between the chamber 5 and the engine 7, and leading the evaporated gas introduced into the chamber 5 to the engine 7 is referred to as the suction port 31. It is noted that in the illustrated example, a lid body 30*a* is welded to the base of the housing 30 to form the chamber 5.

The passage of a current from the feed terminal 12 to the coil 11 generates a magnetic field at the core 13, the yoke 14, the plate 15, and the plunger 16, so that the plunger 16 is sucked to the core 13 to open the valve sheet 18*a*. This establishes a communication through the discharge port 32, the chamber 5, the inner circumferential side of the tubular flow path 18, the valve sheet 18*a*, and the suction port 31. Due to the negative pressure produced in the engine 7, the evaporated gas is sucked to flow from the canister 2 to the engine 7.

When the passage of the current to the coil 11 is stopped, the plunger 16 is urged to the spring 17 to close the valve sheet 18*a*, so that the flowing of the evaporated gas into the engine 7 is stopped.

Similarly, the passage of a current from the feed terminal 22 to the coil 21 generates a magnetic field at the core 23, the yoke 24, the plate 25, and the plunger 26 to thus open the valve sheet 28*a*. This establishes a communication through the discharge port 32, the chamber 5, the inner circumferential side of the tubular flow path 28, the valve sheet 28*a*, the valve communication path 35, and the suction port 31. Due to the negative pressure produced in the engine 7, the evaporated gas is sucked to flow from the canister 2 to the engine 7.

When the passage of a current to the coil 21 is stopped, the plunger 26 is urged to the spring 27 to close the valve sheet 28*a*, so that the flowing of the evaporated gas into the engine 7 is stopped.

As mentioned above, the valve communication path 35 establishing a communication between the first electromagnetic valve 10 and the second electromagnetic valve 20, and the suction port 31 is formed within the housing 30, and therefore, the piping for connecting the electromagnetic valves in parallel can be simplified.

It is noted that used in FIG. 2 are the first electromagnetic valve 10 and the second electromagnetic valve 20 in the reverse suction mode such that the direction in which the evaporated gas flows from the inner circumferential sides of the tubular flow paths 18 and 28 to the outer circumferential side through the valve sheets 18*a* and 28*a*, that is, the negative pressure application direction, and the valve opening direction of the plungers 16 and 26 are equal to each other, and that the negative pressure acts in the valve opening direction; however, positive suction mode may be adopted for each of the valves. The positive suction mode will be described in Embodiment 2 later.

Figure 3:
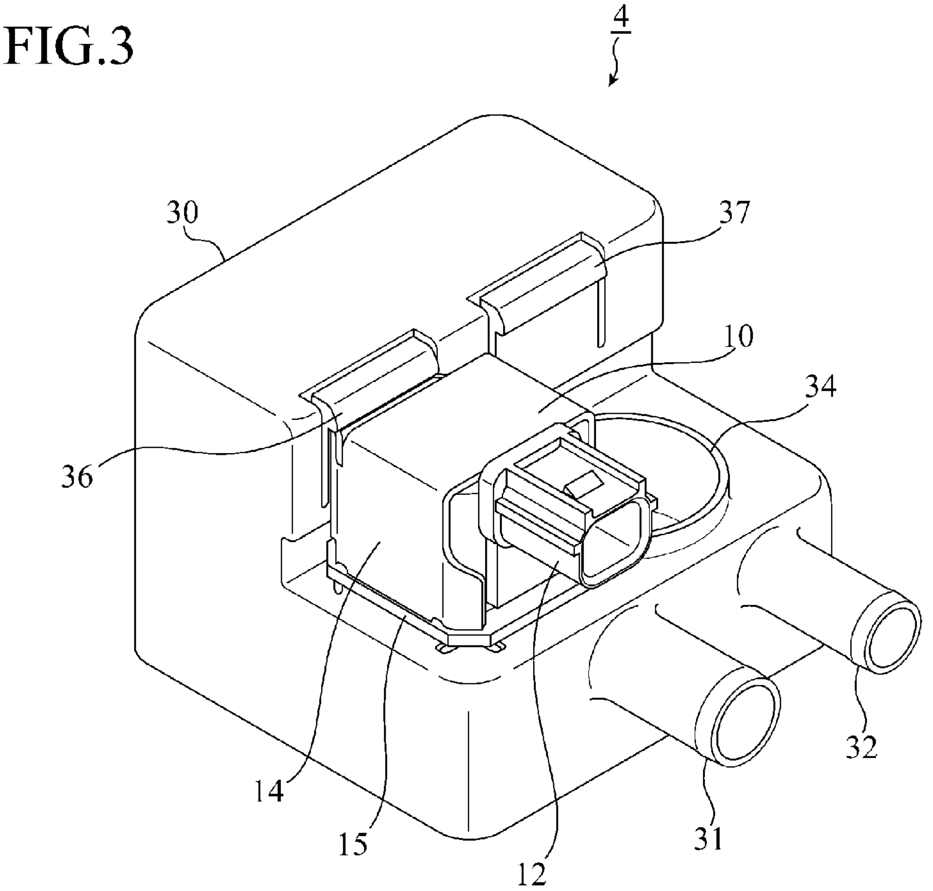
FIG. 3 is an outward appearance perspective view showing the configuration of the dual electromagnetic valve according to Embodiment 1.
Figure 4:
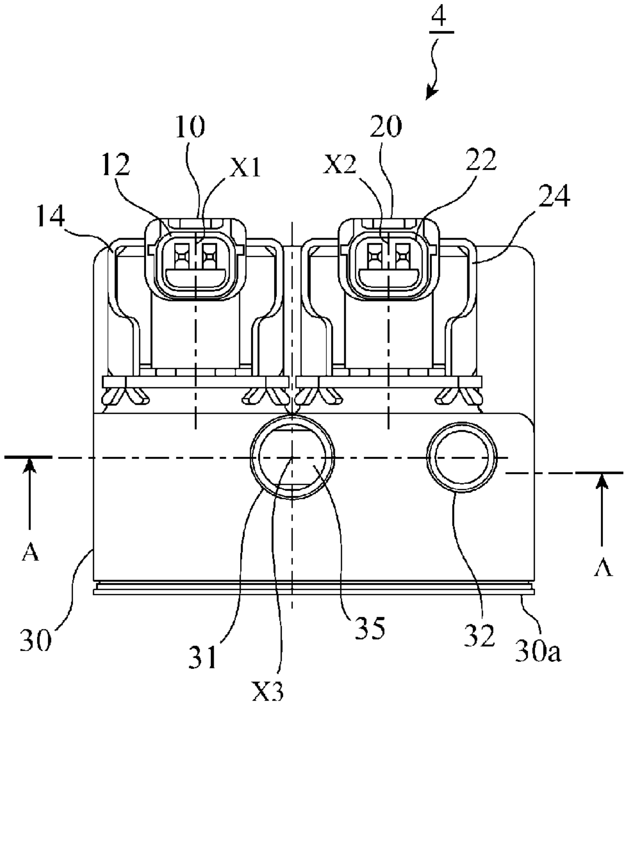
FIG. 4 is a front view showing the configuration of the dual electromagnetic valve according to Embodiment 1.
Figure 5:
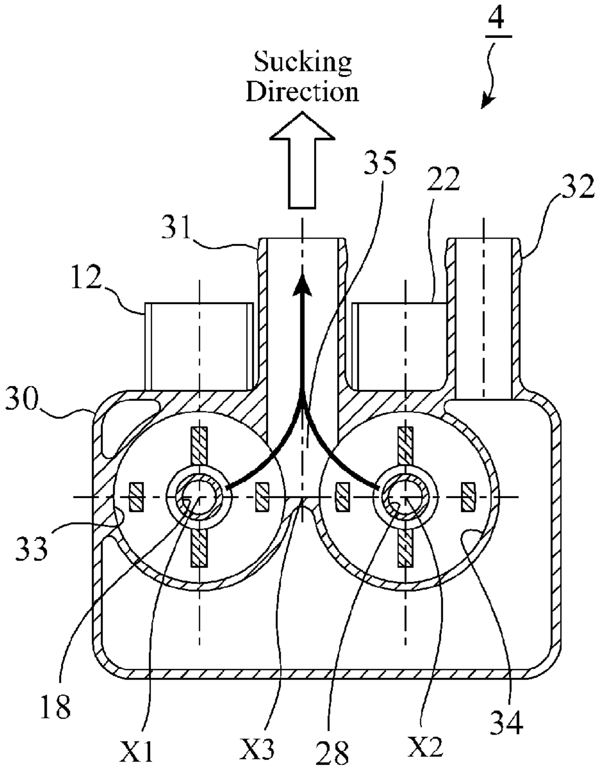
FIG. 5 is a cross-sectional view taken along line AA shown in FIG. 4 of the dual electromagnetic valve according to Embodiment 1.

Next, another configuration example of the housing 30 will be described. FIG. 3 is an outward appearance perspective view of the dual electromagnetic valve 4. FIG. 3 shows the state in which only the first electromagnetic valve 10 is attached to the housing 30. Also, the front view of the dual electromagnetic valve 4 is shown in FIG. 4, and the cross-sectional view taken along line AA is shown in FIG. 5.

The housing 30 is provided in the shape obtained by forming a concave part in one surface of a rectangular parallelepiped made of a resin. The inside of the rectangular parallelepiped is made hollow, and is used as the chamber 5. A lid body 30*a* as a separate unit is attached by welding to the base of the housing 30. In addition, insertion holes 33 and 34 are opened in the base of the concave part, and in the side surface of the concave part, there are formed a holding claw 36 for holding the first electromagnetic valve 10, and a holding claw 37 for holding the second electromagnetic valve 20. When the first electromagnetic valve 10 is mounted to the housing 30, the tubular flow path 18 of the first electromagnetic valve 10 is inserted into the insertion hole 33; the plate 15 is mounted in such a manner as to be hooked on the edge of the insertion hole 33; further, the holding claw 36 is engaged in the edge of the yoke 14, and is allowed to hold the first electromagnetic valve 10. Similarly, for the second electromagnetic valve 20, the tubular flow path 28 is inserted into the insertion hole 34; and the holding claw 37 is engaged in the edge of the yoke 24. In such a way, the first electromagnetic valve 10, the second electromagnetic valve 20, and the chamber 5 can be integrated, and therefore the configuration can be simplified, as compared with an instance where these components are individually formed, and the number of components thereof can be reduced.

Further, it is configured that in FIG. 2 the suction port 31 and the discharge port 32 are formed in the two opposing surfaces of the housing 30, respectively, so that the suction port 31 and the discharge port 32 turn to different directions; however, the arranged positions of the ports are not limited thereto. For example, as shown in FIGS. 3 to 5, when the suction port 31 is arranged between the tubular flow path 18 and the tubular flow path 28, the distances from the valve sheets 18*a* and 28*a* to the suction port 31 are shortened, which provides an effect of reducing the air flow resistance. Further preferably, the position of the central axis X3 of the suction port 31 is arranged at the intermediate position between the central axis X1 of the tubular flow path 18 and the central axis X2 of the tubular flow path 28, which makes it possible to suppress the air flow resistance to a minimum. This can reduce the pressure loss and increase the flow rate. In the case of the above configuration, as shown in FIG. 5, the suction port 31 also serves as the valve communication path 35.

It is noted that even when the arranged positions of the suction port 31 and the discharge port 32 are interchanged, the same effect is produced. In this instance, a fluid is introduced from the discharge port 32 arranged between the tubular flow paths 18 and 28, and the fluid diverges at the valve communication path 35 to be guided to the tubular flow paths 18 and 28; then, the fluid passes through the valve sheets 18*a* and 28*a*, respectively, and merge in the chamber 5 to be led out from the suction port 31 formed in the chamber 5.

Further, as shown in FIGS. 3 to 5, when the protruding directions of the feed terminals 12 and 22, the suction port 31, and the discharge port 32 are made equal, saved space and improvement of layout property thereof can be achieved.

Next, a description will be given to an operation example in which the pulsating sound of the dual electromagnetic valve 4 is reduced.

Figure 6:
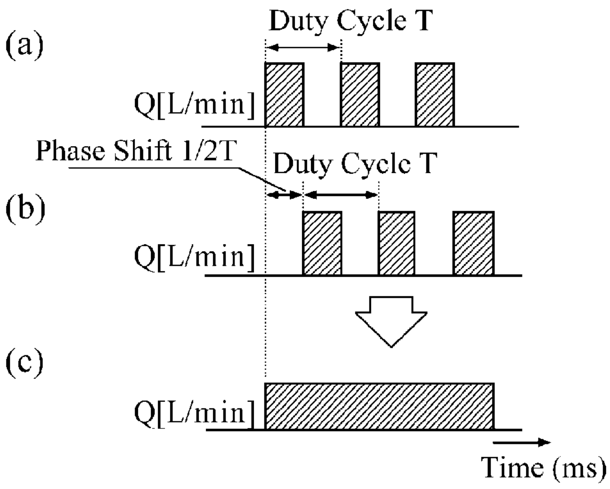
FIG. 6 illustrates graphs showing the operation timings of the dual electromagnetic valve according to Embodiment 1.

FIG. 6 illustrates graphs showing the operation timings of the dual electromagnetic valve 4: FIG. 6(*a*), FIG. 6(*b*), and FIG. 6(*c*) represent the first electromagnetic valve 10, the second electromagnetic valve 20, and the whole dual electromagnetic valve 4, respectively. In each of the graphs, the horizontal axis represents the time [ms], and the vertical axis represents the flow rate Q [L/min]. The driving signal outputted from the control unit 8 has a predetermined Duty cycle T, and as the Duty ratio increases, the flow rate increases. As shown in FIGS. 6(*a*) and 6(*b*), the phases of the driving signals are shifted by 180 degrees to each other to invert the waveforms; thus, the driving cycles of the first electromagnetic valve 10 and the second electromagnetic valve 20 are shifted to each other, so that the pulsating waveform becomes a continuous waveform as shown in FIG. 6(*c*). As a result, the pulsation of the dual electromagnetic valve 4 can be reduced.

Figure 7:
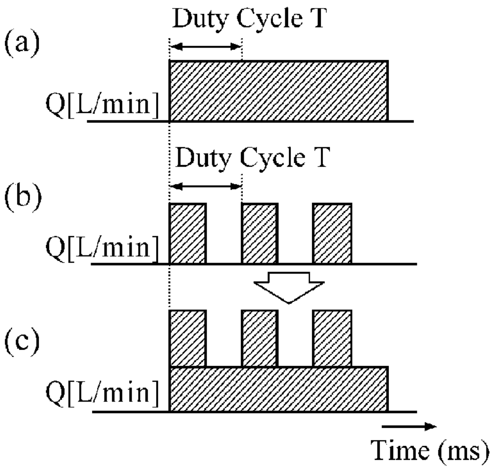
FIG. 7 illustrates graphs showing another example of the operation timings of the dual electromagnetic valve according to Embodiment 1.

Alternatively, the dual electromagnetic valve 4 may be controlled at the operation timings shown in FIG. 7. As shown in FIG. 7(*a*), the first electromagnetic valve 10 is normally opened (or normally closed). As shown in FIG. 7(*b*), when the Duty ratio of the second electromagnetic valve 20 is adjusted to control the flow rate, as shown in FIG. 7(*c*), only the pulsation of the second electromagnetic valve 20 is produced. As a result, the pulsation as the whole dual electromagnetic valve 4 can be reduced. It is noted that needless to say, the Duty ratio of the first electromagnetic valve 10 may be adjusted to control the flow rate, while the second electromagnetic valve 20 may be normally opened (or normally closed).

When the dual electromagnetic valve 4 is driven at the operation timings of FIG. 6 or FIG. 7, the pulsation can be reduce and therefore the chamber 5 for reducing the pulsation is also sufficient in a small capacity. Accordingly, the capacity of the chamber 5 required for the dual electromagnetic valve 4 can be reduced as compared with the capacity of the pulsation reducing chamber required in the case where a high flow rate is controlled by a single electromagnetic valve, which leads to the improvement of the layout property. Further, even as compared with the capacity of the pulsation reducing chamber required in the case where electromagnetic valves with a low flow rate are connected in parallel to control the high flow rate, there is small enough for the capacity of the chamber 5 required for the dual electromagnetic valve 4, which leads to the improvement of the layout property.

Next, a description will be given to an operation example in which the low-flow-rate precision of the dual electromagnetic valve 4 is improved.

Figure 8:
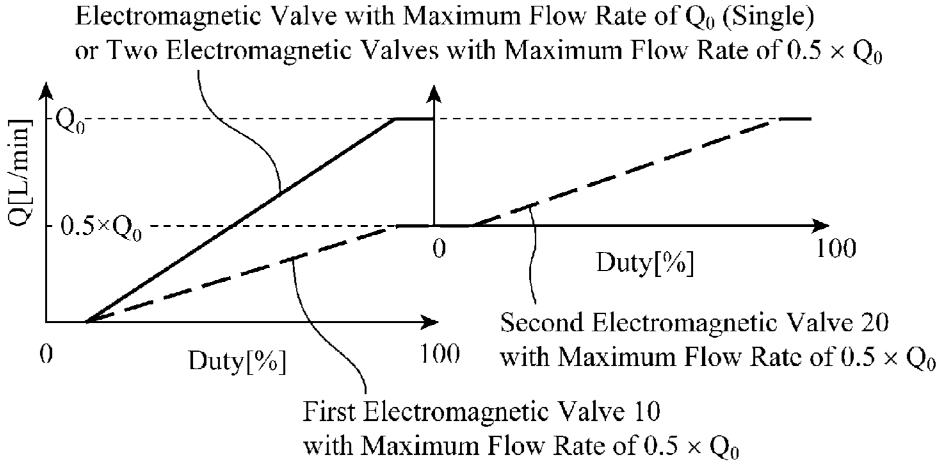
FIG. 8 is a graph showing the flow rate characteristic (broken line) of the dual electromagnetic valve according to Embodiment 1.

FIG. 8 is a graph showing the flow rate characteristic of the dual electromagnetic valve 4 (broken line), wherein the horizontal axis represents the Duty ratio [%] of the driving signal, and the vertical axis represents the flow rate Q [L/min]. The maximum flow rates of the first electromagnetic valve 10 and the second electromagnetic valve 20 each are assumed to be the equal flow rate of $0.5 \times Q_0$. The maximum flow rate of the whole dual electromagnetic valve 4 is assumed to be $Q_0$. The solid line represents the flow rate characteristic of the electromagnetic valve (single) of the maximum flow rate $Q_0$, or the flow rate characteristic in the case where two of the electromagnetic valve with a maximum flow rate of $0.5 \times Q_0$ are driven simultaneously.

In the evaporated gas treatment system in a vehicle, when a high-concentration evaporated gas accumulated in the canister 2 is burned in the engine 7, the degradation of the flow rate resolution of the dual electromagnetic valve 4 reduces the efficiency of the evaporated gas treatment. When the high-flow-rate control is performed using the electromagnetic valve of the Duty driving system alone, or when the high-flow-rate control is performed by a simultaneous driving using two of a low-flow-rate electromagnetic valve, as indicated by the solid line of FIG. 8, the change amount ($\Delta Q$) of the flow rate Q according to the Duty ratio is large, and therefore the degradation of the flow rate resolution is inevitable. Thus, in the dual electromagnetic valve 4 according to Embodiment 1, two of a low-flow-rate electromagnetic valve are used; in the flow rate region of 0 to $0.5 \times Q_0$, the first electromagnetic valve 10 is normally closed, and also the second electromagnetic valve 20 is Duty driven to perform the flow rate control; in the flow rate region of $0.5 \times Q_0$ to $Q_0$, the first electromagnetic valve 10 is normally opened, and also the second electromagnetic valve 20 is Duty driven to perform the flow rate control. This enables the improvement of the low-flow-rate precision (flow rate resolution) in a high-flow-rate control. It is noted that needless to say, the second electromagnetic valve 20 may be normally closed or normally opened, and also the first electromagnetic valve 10 may be Duty driven.

Though FIG. 8 shows the example using the first electromagnetic valve 10 and the second electromagnetic valve 20 having the same maximum flow rate, it is also possible to further improve the resolution in the low-flow-rate region using the first electromagnetic valve 10 and the second electromagnetic valve 20 having different maximum flow rates.

Figure 9:
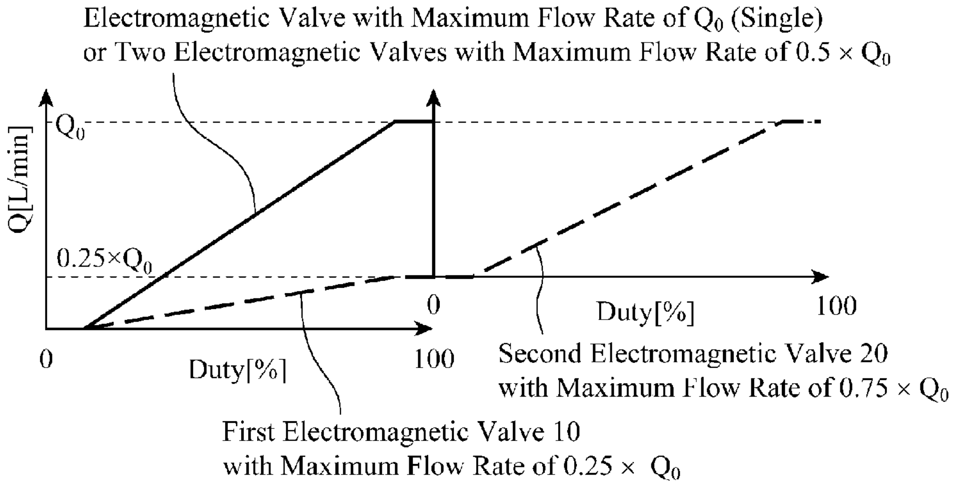
FIG. 9 is a graph showing another example of the flow rate characteristic (broken line) of the dual electromagnetic valve according to Embodiment 1.

In the example of FIG. 9, the maximum flow rate of the whole dual electromagnetic valve 4 is assumed to be $Q_0$. For example, the maximum flow rate of the first electromagnetic valve 10 is assumed to be $0.25 \times Q_0$, and the maximum flow rate of the second electromagnetic valve 20 is assumed to be $0.75 \times Q_0$. In the flow rate region of 0 to $0.25 \times Q_0$, the second electromagnetic valve 20 is normally closed, and the first electromagnetic valve 10 is Duty driven to perform the flow rate control, and in the flow rate region of $0.25 \times Q_0$ to $Q_0$, the first electromagnetic valve 10 is normally opened, and also the second electromagnetic valve 20 is Duty driven to perform the flow rate control. This enables the further improvement of the low-flow-rate control (flow rate resolution) with achieving a higher flow rate of the dual electromagnetic valve 4.

In order to achieve a lower flow rate of the first electromagnetic valve 10 and a higher flow rate of the second electromagnetic valve 20, for example, the valve sheet 18*a* of the first electromagnetic valve 10 is reduced in diameter to reduce the flow rate. With only the reduction of the diameter of the valve sheet 18*a*, most of the components of the first electromagnetic valve 10 and the second electromagnetic valve 20 can be used in common, resulting in a high versatility. Alternatively, for example, the second valve sheet 28*a* of the second electromagnetic valve 20 may be increased in diameter, and also the plunger 26 is increased in diameter, thereby increasing the flow rate, and further the coil 21 may be increased in size with an increase in diameter of the plunger 26.

It is noted that needless to say, the maximum flow rate of the first electromagnetic valve 10 may be increased, and the maximum flow rate of the second electromagnetic valve 20 may be reduced.

Further, the pulsation during the operation shown in FIGS. 8 and 9 is caused by only one unit to be Duty driven, resulting in the pulsation reducing effect, similarly to the case shown in FIG. 7.

As described above, the dual electromagnetic valve 4 according to Embodiment 1 is configured to include: the housing 30 composed of the suction port 31, the discharge port 32, and the chamber 5; the first electromagnetic valve 10 having the tubular flow path 18 inserted into the chamber 5, and communicating with the suction port 31 and the discharge port 32, and a solenoid part for operating the plunger 16 and opening/closing the tubular flow path 18; the second electromagnetic valve 20 similarly having the tubular flow path 28 inserted into the chamber 5, and communicating with the suction port 31 and the discharge port 32, and a solenoid part for operating the plunger 26 and opening/closing the tubular flow path 28; and the valve communication path 35, formed in the housing 30, for merging respective one sides of the tubular flow paths 18 and 28 to be led to the suction port 31. For this reason, through the use of two electromagnetic valves, it is possible to improve the flow rate resolution, and improve the controllability as compared with the instance where the high flow rate is controlled by a single electromagnetic valve. Further, when the two electromagnetic valves are integrated with the chamber, and the fluids passing through the electromagnetic valves are merged to lead the resultant to the suction port, the pressure loss can be reduced with simplified piping, and also the pulsating sound can be reduced. Further, when the dual electromagnetic valve 4 is used for the evaporated gas treatment system, it is possible to increase the amount of the evaporated gas even in the evaporated gas treatment system of a vehicle that is low in engine operation frequency due to an implementation of HEV and the like, which enables to improve the treatment capability.

Further, according to Embodiment 1, the housing 30 is configured such that anyone of the suction port 31 and the discharge port 32 is arranged between the tubular flow paths 18 and 28, and therefore the air flow resistance is reduced to thereby suppress the pressure loss.

Particularly, when the central axis position of any one of the suction port 31 and the discharge port 32 is arranged at the central position between the tubular flow paths 18 and 28, the air flow resistance can be suppressed to a minimum.

Further, according to Embodiment 1, it is configured that provided is the control unit 8 for outputting a driving signal to each of the first electromagnetic valve 10 and the second electromagnetic valve 20, and individually adjusting the valve opening degree according to the Duty ratio of the driving signal, wherein the phases in the Duty cycle of the driving signal are set different from each other, and therefore it can be expected that the pulsation occurrence timings are shifted from each other to produce the mutual canceling effect. Further, the chamber 5 can be reduced in size by the reduction of the pulsation, resulting in the improvement of the layout property.

Particularly, when the phases in the Duty cycle of the driving signal are inverted by 180 degrees to each other, the pulsating waveform can be changed into a continuous waveform to thereby reduce the pulsation. Further, when one electromagnetic valve of the first electromagnetic valve 10 and the second electromagnetic valve 20 is fully opened or fully closed, and the opening degree of the other electromagnetic valve is adjusted, the resulting pulsation can be limited to that from only one electromagnetic valve with a low flow rate, which can reduce the pulsating sound as the whole dual electromagnetic valve 4.

Further, according to Embodiment 1, it is configured that when the control unit 8 controls the flow rate region beyond the maximum flow rate of one electromagnetic valve of the first electromagnetic valve 10 and the second electromagnetic valve 20, it fully opens one electromagnetic valve, and adjusts the opening degree of the other electromagnetic valve. For this reason, it is possible to improve the flow rate resolution as compared with the instance where a high flow rate is controlled by a single electromagnetic valve. Further, only the pulsation for one low-flow-rate electromagnetic valve occurs, and the pulsation as the whole dual electromagnetic valve 4 can be reduced.

Particularly, with respect to the dual electromagnetic valve 4 in which the maximum flow rates of the first electromagnetic valve 10 and the second electromagnetic valve 20 are made equal, the control unit 8 fully closes one electromagnetic valve and also adjusts the opening degree of the other electromagnetic valve when controlling the flow rate region less than the maximum flow rate, while it fully opens one electromagnetic valve and also adjusts the opening degree of the other electromagnetic valve when controlling the flow rate region not less than the maximum flow rate.

Further, with respect to the dual electromagnetic valve 4 in which as compared with the maximum flow rate of one electromagnetic valve, the maximum flow rate of the other electromagnetic valve is lower; when controlling the flow rate region less than the lower maximum flow rate, the control unit 8 adjusts the opening degree of the electromagnetic valve with the lower maximum flow rate and also fully closes the other electromagnetic valve, while when controlling the flow rate region not less than the lower maximum flow rate, it fully opens the electromagnetic valve with the smaller maximum flow rate and also adjusts the opening degree of the other electromagnetic valve to thereby achieve the further improvement of the low rate resolution in the low-flow-rate region.

Embodiment 2

In the above Embodiment 1, both the first electromagnetic valve 10 and the second electromagnetic valve 20 are provided in the reverse suction mode, but may also be provided in different suction modes.

Figure 10:
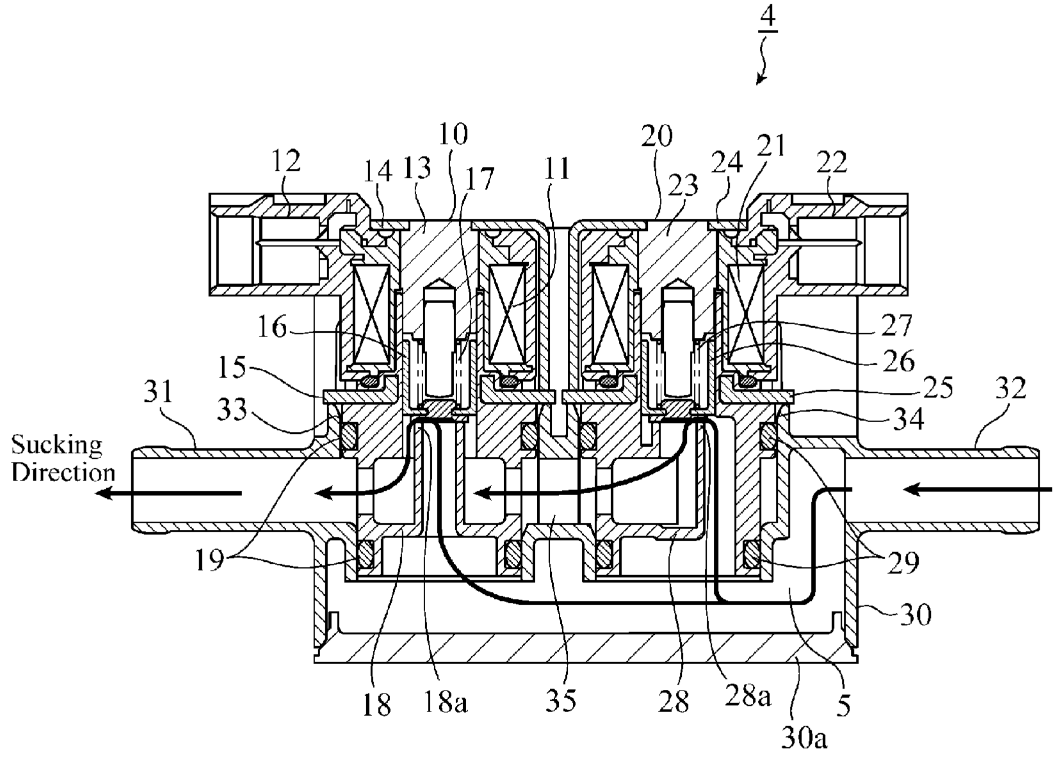
FIG. 10 is a longitudinal cross-sectional view showing the configuration of a dual electromagnetic valve according to Embodiment 2 of the invention.

FIG. 10 shows a configuration example of the dual electromagnetic valve 4 in which the suction modes of the first electromagnetic valve 10 and the second electromagnetic valve 20 are constituted differently. It is noted that the parts in FIG. 10 equal to or equivalent to those of FIGS. 2 to 6 are denoted by the same reference numerals and signs, and explanations thereof will be omitted.

In the present Embodiment 2, the first electromagnetic valve 10 is provided in the reverse suction mode in which the negative pressure application direction is equal to the valve opening direction of the plunger 16, and the negative pressure acts in the valve opening direction, while the second electromagnetic valve 20 is provided in the positive suction mode in which the negative pressure application direction is equal to the valve closing direction of the plunger 16, and the negative pressure acts in the valve closing direction. Therefore, when the coil 11 is electrified in the first electromagnetic valve 10, the plunger 16 is sucked to the core 13 to open the valve sheet 18*a*, and then the evaporated gas flows from the inner circumferential side of the tubular flow path 18 through the valve sheet 18*a* in the direction of the suction port 31. In one second electromagnetic valve 20, when the coil 21 is electrified, the plunger 26 is sucked to the core 23 to open the valve sheet 28*a*, and then the evaporated gas passes from the outer circumferential side of the tubular flow path 28 through the valve sheet 28*a*, and enters the inner circumferential side of the tubular flow path 28 to flow in the direction of the valve communication path 35 and the suction port 31.

Figure 11:
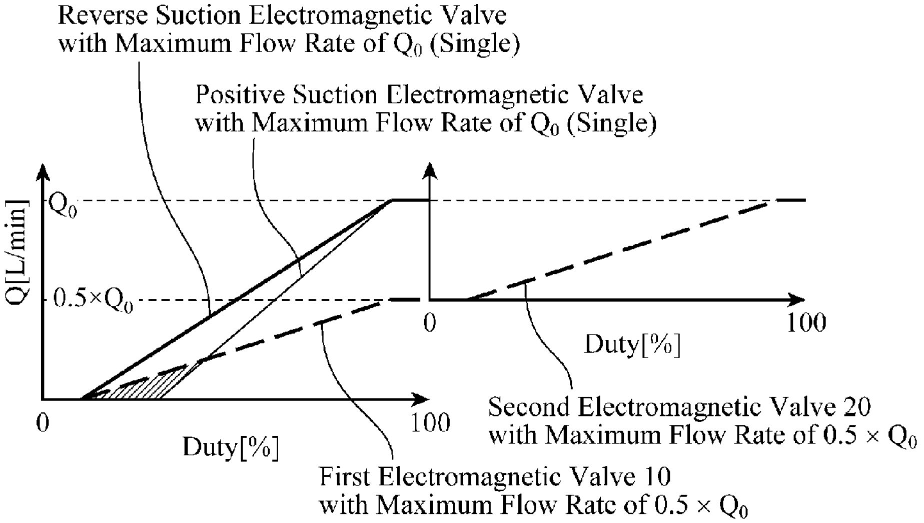
FIG. 11 is a graph showing the flow rate characteristic (broken line) of the dual electromagnetic valve according to Embodiment 2, and is a driving example in a high negative pressure region.
Figure 12:
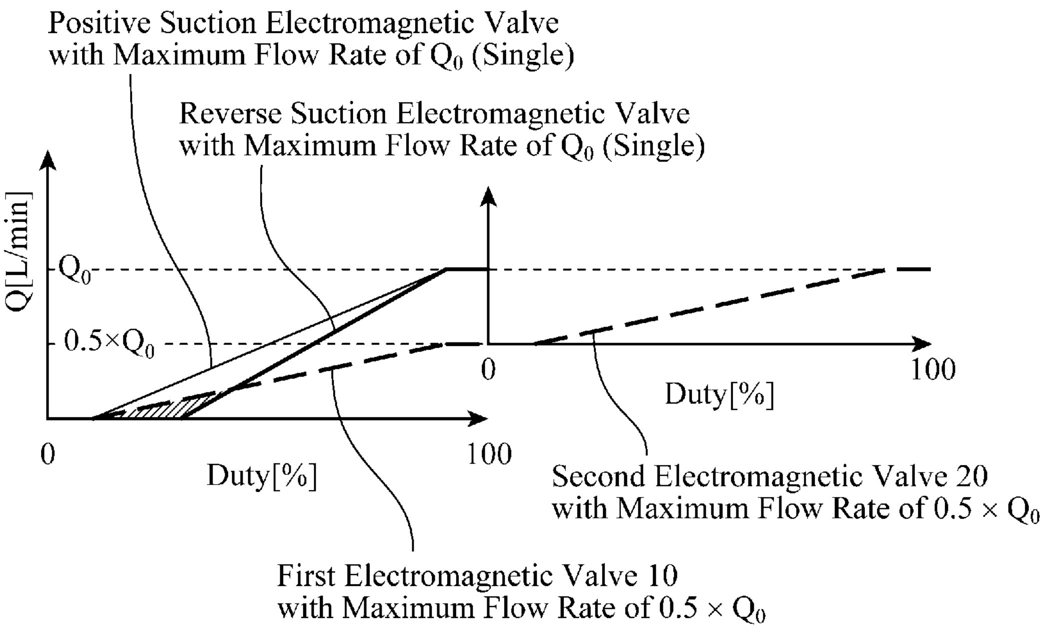
FIG. 12 is a graph showing the flow rate characteristic (broken line) of the dual electromagnetic valve according to Embodiment 2, and is a driving example in a low negative pressure region.

FIG. 11 is a graph showing the flow rate characteristic in which the electromagnetic valve is driven in a high negative pressure region. FIG. 12 is a graph showing the flow rate characteristic in which the electromagnetic valve is driven in a low negative pressure region. In both of the graphs, the horizontal axis represents the Duty ratio [%] of a driving signal, and the vertical axis represents the flow rate Q [L/min]. The flow rate characteristic of the dual electromagnetic valve 4 according to the present Embodiment 2 is indicated by a broken line. Each maximum flow rate of the first electromagnetic valve 10 and the second electromagnetic valve 20 is $0.5 \times Q_0$, and the maximum flow rate of the whole dual electromagnetic valve 4 is $Q_0$. In addition, the flow rate characteristic of the reverse-suction-mode electromagnetic valve (single) with a maximum flow rate of $Q_0$ is indicated by a thick line, and the flow rate characteristic of the positive-suction-mode electromagnetic valve (single) with a maximum flow rate of $Q_0$ is indicated by a thin line.

Since the electromagnetic valve in the reverse suction mode requires a valve closing power in the high negative pressure region, the urging force of a spring for urging the plunger in the valve closing direction is increased. For this reason, the valve closing power in the low negative pressure region is also increased, and as indicated by the thick line in FIG. 12, unless the Duty ratio is increased to a certain degree, no evaporated gas flows, and the tilt of the subsequent flow rate characteristic (i.e., the rising flow rate) is also increased, resulting in the deterioration of the operability (flow rate resolution). Thus, in order to improve the operability in the low negative pressure region, it is necessary that the coil is increased in size or the magnetic efficiency is improved to impart a high electromagnetic sucking force.

On the other hand, for the positive suction mode electromagnetic valve, as indicated by the thin line in FIG. 11, unless the Duty ratio is increased to a certain degree during the high negative pressure, no evaporated gas flows, and the subsequent rising flow rate is also increased, resulting in the deterioration of the operability (flow rate resolution) in the high negative pressure region. Thus, in order to improve the operability in the high negative pressure region, it is necessary that the coil is increased in size or the magnetic efficiency is improved to impart a high electromagnetic sucking force.

As mentioned above, there is a trade-off relationship such that in the reverse suction mode, the improvement of the operability during the low negative pressure requires the high electromagnetic sucking force, while in the positive suction mode, the improvement of the operability during the high negative pressure requires the high electromagnetic sucking force; thus, for a high-flow-rate control, the scale-up of the base is inevitable.

Thus, in the present Embodiment 2, with the electromagnetic sucking force and the urging force of the springs 17 and 27 without change, the first electromagnetic valve 10 is provided in the reverse suction mode, and the second electromagnetic valve 20 is provided in the positive suction mode. Then, as indicated by a dotted line in FIG. 11, in the high negative pressure region, while the first electromagnetic valve 10 in the reverse suction mode is driven, the second electromagnetic valve 20 in the positive suction mode is normally closed or normally opened, thereby enhancing the operability in the high negative pressure region. In such a way, particularly, in the low flow rate region of a shaded area of FIG. 11, as compared with the electromagnetic valve (single) in the reverse suction mode of the high flow rate indicated by the thick line, the rising flow rate of the first electromagnetic valve 10 indicated by the dotted line becomes lower, resulting in the improvement of the flow rate resolution. Further, as compared with the electromagnetic valve (single) in the positive suction mode of the high flow rate indicated by the thin line, the Duty ratio at which the evaporated gas starts to flow of the first electromagnetic valve 10 indicated by the dotted line is decreased, and the subsequent rising flow rate is also lower, resulting in the improvement of the flow rate resolution.

Further, as indicated by the dotted line in FIG. 12, in the low negative pressure region, while the second electromagnetic valve 20 in the positive suction mode is driven, the first electromagnetic valve 10 in the reverse suction mode is normally closed or normally opened, thereby improving the operability in the low negative pressure region. In such a way, as in the above, in the low flow rate region of the shaded area of FIG. 12, as compared with the high-flow-rate reverse suction mode electromagnetic valve (single) indicated by a thick line, and a high-flow-rate positive suction mode electromagnetic valve (single) indicated by a thin line, the flow rate resolution of the second electromagnetic valve 20 indicated by a dotted line is improved.

As mentioned above, when the positive suction mode electromagnetic valve and the reverse suction mode electromagnetic valve are connected in parallel, it is possible to improve the operability in the overall negative pressure regions with keeping a low electromagnetic sucking force. Accordingly, the coils 11 and 21 can be reduced in size, which enables the downsizing and weight reduction of the dual electromagnetic valve 4. Further, since the pulsation during the operation shown in FIGS. 11 and 12 is caused by only one unit to be Duty driven, there is a pulsation reducing effect is obtained as in the case shown in FIG. 7 of the above Embodiment 1.

Incidentally, a pressure sensor is disposed between the throttle valve 6 and the engine 7; as the control unit 8 determines whether the pressure is a high negative pressure or a low negative pressure according to the detected value of the pressure sensor, the first electromagnetic valve 10 and the second electromagnetic valve 20 may be drive-controlled.

Further, needless to say, the first electromagnetic valve 10 may be provided in the positive suction mode, and the second electromagnetic valve 20 may be provided in the reverse suction mode.

Further, it is configured that in FIG. 10 the suction port 31 and the discharge port 32 are formed in the two opposing surfaces of the housing 30, respectively, and that the suction port 31 and the discharge port 32 turn to different directions, which is not limited to this, as shown in FIGS. 3 to 5, any one of the suction port 31 and the discharge port 32 may be disposed between the tubular flow paths 18 and 28, to thereby suppress the air flow resistance.

As described above, the dual electromagnetic valve 4 according to Embodiment 2 is configured such that in one electromagnetic valve of the first electromagnetic valve 10 and the second electromagnetic valve 20, a fluid flows in the valve opening direction through the tubular flow path 18 or 28, and that in the other electromagnetic valve, a fluid flows in the valve closing direction through the tubular flow path 18 or 28. For this reason, it is possible to improve the flow rate resolution, and to improve the controllability. Further, it becomes possible to reduce the size of the low-flow-rate coils 11 and 21. As a result, it becomes possible to reduce the size and weight of the dual electromagnetic valve 4.

Incidentally, in the present invention, free combinations or modifications of respective embodiments are possible within the scope of the spirit of the invention.

INDUSTRIAL APPLICABILITY

As described above, since the dual electromagnetic valve of the present invention is configured such that the two electromagnetic valves are inserted into the common chamber to be integrated to improve the flow rate resolution and improve the controllability, and that the piping is simplified to reduce the pressure loss and also reduce the pulsating sound, it is suitable for use in the electromagnetic valve for controlling the amount of the evaporated gas in the evaporated gas treatment system of a vehicle and so on.

The invention claimed is:

1. A dual electromagnetic valve, comprising:

a housing including a suction port, a discharge port, and a chamber;

a first electromagnetic valve having a flow path part inserted into the chamber and communicating with the suction port and the discharge port, and a solenoid part for operating a valve to open and close the flow path part;

a second electromagnetic valve having a flow path part inserted into the chamber and communicating with the suction port and the discharge port, and a solenoid part for operating a valve to open and close the flow path part; and a connection path, provided in the housing, for merging one side of the flow path part of the first electromagnetic valve and one side of the flow path part of the second electromagnetic valve to be connected to one of the suction port and the discharge port, wherein in the housing, one of the suction port and the discharge port is arranged between the flow path parts of a pair of the electromagnetic valves, and a central axis position of one of the suction port and the discharge port is arranged at a central position between the flow path parts of the pair of the electromagnetic valves.

2. The dual electromagnetic valve according to claim 1, wherein in one electromagnetic valve of a pair of the electromagnetic valves, a fluid flows in the valve opening direction through the flow path part, and in the other electromagnetic valve, a fluid flows in the valve closing direction through the flow path part.

3. The dual electromagnetic valve according to claim 1, comprising a control unit for outputting a driving signal to each of the pair of the electromagnetic valves, and individually adjusting a valve opening degree according to the Duty ratio of the driving signal.

4. The dual electromagnetic valve according to claim 3, wherein the control unit makes the phases in the Duty cycle of the driving signal to be outputted to the pair of the electromagnetic valves different from each other.

5. The dual electromagnetic valve according to claim 4, wherein the control unit inverts the phases in the Duty cycle of the driving signal to be outputted to the pair of the electromagnetic valves by 180 degrees with each other.

6. The dual electromagnetic valve according to claim 3, wherein the control unit fully opens or fully closes one electromagnetic valve of the pair of the electromagnetic valves, and adjusts the opening degree of the other electromagnetic valve.

7. The dual electromagnetic valve according to claim 3, wherein when the control unit controls a flow rate region beyond the maximum flow rate of one electromagnetic valve of the pair of the electromagnetic valves, the controller fully opens the one electromagnetic valve, and adjusts the opening degree of the other electromagnetic valve.

8. The dual electromagnetic valve according to claim 7, wherein the pair of the electromagnetic valves are equal in the maximum flow rate, and when the control unit controls a flow rate region less than the maximum flow rate, the control unit fully closes one of the electromagnetic valves, and also adjusts the opening degree of the other one of the electromagnetic valves, and when the control unit controls a flow rate region not less than the maximum flow rate, the control unit fully opens one of the electromagnetic valves, and also adjusts the opening degree of the other one of the electromagnetic valves.

9. The dual electromagnetic valve according to claim 7, wherein in the pair of the electromagnetic valves, as compared with the maximum flow rate of one of the electromagnetic valves, the maximum flow rate of the other one of the electromagnetic valves is smaller, when controlling a flow rate region less than the smaller maximum flow rate, the control unit adjusts the opening degree of the electromagnetic valve having the smaller maximum flow rate, and fully closes the other one of the electromagnetic valves, and when controlling a flow rate region not less than the smaller maximum flow rate, the control unit fully opens the electromagnetic valve having the smaller maximum flow rate, and adjusts the opening degree of the other one of the electromagnetic valves.

10. An evaporated gas treatment system, comprising:

a canister for collecting an evaporated gas volatilized in a fuel tank;

an engine for sucking the evaporated gas, which is collected in the canister by a negative pressure, for recombustion; and a dual electromagnetic valve according to claim 1 for controlling the amount of the evaporated gas flowing through a piping connecting the canister and the engine.

* * * * *